(12) United States Patent
Lopes et al.

(10) Patent No.: US 9,446,889 B2
(45) Date of Patent: Sep. 20, 2016

(54) REUSABLE PIZZA PAN SET

(76) Inventors: Susan Lopes, Mill Valley, CA (US);
Jeffrey Saake, San Francisco, CA (US)

( * ) Notice: Subject to any disclaimer, the term of this patent is extended or adjusted under 35 U.S.C. 154(b) by 0 days.

(21) Appl. No.: 13/344,902

(22) Filed: Jan. 6, 2012

(65) Prior Publication Data

US 2012/0175367 A1    Jul. 12, 2012

Related U.S. Application Data

(60) Provisional application No. 61/430,582, filed on Jan. 7, 2011.

(51) Int. Cl.
| | | |
|---|---|---|
| *B65D 51/00* | (2006.01) | |
| *B65D 51/16* | (2006.01) | |
| *B65D 25/14* | (2006.01) | |
| *B65D 43/02* | (2006.01) | |

(52) U.S. Cl.
CPC ........... *B65D 51/1611* (2013.01); *B65D 25/14* (2013.01); *B65D 43/0222* (2013.01); *B65D 2543/00092* (2013.01); *B65D 2543/00277* (2013.01); *B65D 2543/00407* (2013.01); *B65D 2543/00527* (2013.01); *B65D 2543/00537* (2013.01); *B65D 2585/366* (2013.01); *Y02W 30/807* (2015.05)

(58) Field of Classification Search
CPC .. B65D 25/14; B65D 25/16; B65D 51/1608; B65D 51/1611; B65D 2543/00092; B65D 2543/00277; B65D 2543/00407; B65D 2543/00351; B65D 2585/366; B65D 85/345; B65D 2581/3406; Y02W 30/807

USPC ............ 220/380, 781, 367.1, 369–374, 745, 220/913, DIG. 27, 747, 573.1; 206/514, 206/551; 215/902

See application file for complete search history.

(56) References Cited

U.S. PATENT DOCUMENTS 1,945,397 A * 1/1934 Gray .............................. 220/645
2,498,534 A * 2/1950 Drum .................... A47J 37/101
220/370

(Continued)

FOREIGN PATENT DOCUMENTS

| BE | EP 0574072 A1 * 12/1993 ............ A47J 47/145 |
|---|---|
| WO | WO 95/29619 * 11/1995 |

*Primary Examiner* — Fenn Mathew
*Assistant Examiner* — Robert Stodola

(57) ABSTRACT

A reusable pizza container configured to enclose a hot pizza for temporary storage or transport and to prevent moisture from entering into the top, bottom or side surfaces of the pizza. The container has a lid, a removable Vapor Transport Mechanism, and a bottom. The lid facilitates convection heat flow and the flow of moisture along the interior sides of the lid. Raised radial ribs enable the lids to be stacked. The raised radial ribs in the lid have perforations to allow hot vapor to escape and minimize moisture within the enclosed area. The lid nests securely into the bottom to prevent dislodging of moisture during transport. The removable Vapor Transport Mechanism (VTM), a micromesh membrane that fits within the lid, allows vapor to pass upwards through the membrane but prevents moisture from dripping downwards onto the upper pizza surface. The bottom has an interior moat that collects the moisture that flows along the interior sides of the lid to prevent it from entering the sides of the pizza thereby preventing moisture from entering the bottom surface of the pizza. The bottom has raised circular domes to elevate the pizza above the surface and to prevent moisture from entering the bottom surface of the pizza.

7 Claims, 15 Drawing Sheets

(56) References Cited

U.S. PATENT DOCUMENTS

| | | | |
|---|---|---|---|
| 3,335,846 A * | 8/1967 | Mills | 206/551 |
| 3,484,015 A * | 12/1969 | Rowan | 220/4.21 |
| 3,938,726 A * | 2/1976 | Holden et al. | 229/406 |
| 3,958,504 A * | 5/1976 | Levin | 99/426 |
| 4,260,060 A * | 4/1981 | Faller | 229/104 |
| 4,304,106 A * | 12/1981 | Donnelly | 62/457.6 |
| 4,360,118 A * | 11/1982 | Stern | 220/4.24 |
| 4,373,636 A * | 2/1983 | Hoffman | 206/551 |
| 4,848,543 A * | 7/1989 | Doboze | 206/551 |
| 4,883,195 A * | 11/1989 | Ott et al. | 220/839 |
| 4,933,193 A * | 6/1990 | Fisher | 426/107 |
| 5,076,434 A * | 12/1991 | Hoffman, Jr. | 206/509 |
| 5,346,312 A | 9/1994 | Mabry et al. | |
| 5,352,465 A * | 10/1994 | Gondek et al. | 426/87 |
| 5,472,139 A * | 12/1995 | Valdman et al. | 229/407 |
| 5,543,606 A * | 8/1996 | Gics | 219/730 |
| 5,565,125 A * | 10/1996 | Parks | 219/759 |
| 5,585,027 A * | 12/1996 | Young | 219/730 |
| 5,605,231 A * | 2/1997 | Borsboom et al. | 206/551 |
| 6,019,511 A * | 2/2000 | Thomas et al. | 383/113 |
| 6,056,146 A * | 5/2000 | Varakian et al. | 220/370 |
| 6,095,324 A * | 8/2000 | Mullin | 206/204 |
| 6,100,514 A * | 8/2000 | Davis | 219/735 |
| 6,188,055 B1 * | 2/2001 | Walters | 219/730 |
| 6,257,434 B1 * | 7/2001 | Lizzio | 220/4.23 |
| 6,627,862 B1 * | 9/2003 | Pedersen | 219/730 |
| D620,765 S | 8/2010 | Sudia | |
| D620,766 S | 8/2010 | Sudia | |
| 7,942,268 B2 * | 5/2011 | Manca | 206/551 |
| 7,980,412 B2 * | 7/2011 | Belleggia | 220/608 |
| 8,070,116 B1 * | 12/2011 | Malaspino et al. | 248/176.2 |
| 8,096,437 B1 * | 1/2012 | Ryan | 220/370 |
| 8,192,537 B2 * | 6/2012 | Alemao | 96/108 |
| 2006/0147588 A1 * | 7/2006 | Garwood | 426/392 |
| 2008/0178747 A1 * | 7/2008 | Baker et al. | 99/422 |
| 2008/0296303 A1 * | 12/2008 | Krent et al. | 220/370 |
| 2009/0057381 A1 * | 3/2009 | Gokhale | 229/104 |
| 2010/0155358 A1 * | 6/2010 | George | 215/356 |
| 2011/0127282 A1 * | 6/2011 | Carvajal et al. | 220/731 |
| 2012/0024859 A1 * | 2/2012 | Longoni et al. | 220/367.1 |

\* cited by examiner

REUSABLE PIZZA PAN SET

REFERENCE TO RELATED APPLICATIONS

This application claims one or more inventions which were disclosed in Provisional Application No. 61/430,582, filed Jan. 7, 2011, entitled "Reusable Pizza Pan Set". The benefit under 35 USC §119(e) of the United States provisional application is hereby claimed, and the aforementioned application is hereby incorporated herein by reference.

BACKGROUND OF THE INVENTION

1. Field of the Invention

This invention relates in general to metal pans or containers for food, and more specifically, to a reusable pizza pan set.

2. Description of Related Art

The US pizza industry generated $3.7 billion in revenues from Jun. 20, 2008 to Jun. 20, 2009, down less than 1% from 2007, proving that the pizza industry is recession-proof. Pizza consumption, particularly take out and home delivery are on the rise. There is also increasing consumer interest in green business practices such as the use of reusable and sustainable packaging.

Over 3 billion cardboard pizza boxes are produced annually (some estimates are as high as 4 billion) in the United States. A traditional cardboard pizza box has a single-purpose use and can only be used one time, perpetuating the single-use mentality among consumers, particularly school age children.

Consumer interest, the growth of the pizza take-out and home delivery industry and the subsequent demand for more and better packaging solutions, have all generated the need for an alternative to the standard cardboard pizza box.

Grease-stained pizza boxes cannot be recycled contrary to widespread belief. The general public is unaware that grease contamination prevents recycling or composting, unless disposed of in commercial composters.

The corrugated cardboard becomes soiled with grease from cheese and toppings, once a pizza is placed in a box. Once soiled, the paper cannot be recycled because the paper fibers cannot be separated from the oils during the pulping process.

When cardboard is recycled it is mixed with water and turns into a slurry. Greasy pizza boxes, when added to slurry, form a layer of oil at the top. Once there is oil in the slurry, the recycling process needs to be stopped and the machines need to be cleaned.

Estimates put the cost of irresponsible contamination at $700 million per year in 2008, due to damage to machinery, disposal costs for the non-recyclable materials and wasted time, materials and efficiency.

The environmental benefits of not using cardboard boxes include conserving energy, saving trees, reducing greenhouse gases, reducing waste, a smaller carbon footprint and reducing landfills. Eliminating one ton of cardboard saves over 9 cubic yards of landfill space.

The majority of cardboard pizza boxes contain some recycled paper. While this would seem to be a positive step environmentally, it may present a health risk to pizza consumers. Studies now show that recycled paper contains bisphenol A (BPA). Concerns about the safety of BPAs in consumer products have been raised most recently by the US FDA in 2010 and it is declared a toxic substance in Canada.

Regardless of the design or shape of a cardboard pizza box or pizza transport solution, there is a certain common goal—to retain the quality of the pizza. A crispy, not soggy crust and fresh-from-the-oven flavor and consistency (no cardboard taste) are desired characteristics. Pizza, when delivered, often suffers and pales in comparison to a pizza eaten at a restaurant or pizzeria. Solutions to these quality issues for delivered pizzas have not been effectively implemented.

Product heat loss for delivered pizzas contributes to pizza quality deterioration. There have been numerous attempts to rectify this problem with multiple inventions. Ultimately, consumers continue to remove their pizzas from the cardboard boxes and reheat them in the oven or on separate baking pans.

Prior Art includes Design Pats. D620,765 and D620,766 for Reusable Pizza Containers, new to the market in 2009. However, these containers are made of plastic, are square in shape, do not have the Vapor Transport Mechanism component, and do not have the raised circular domes in the bottom or the shape of the top, which facilitate convection heat and moister flow. The designs in the listed design patents cannot be used for reheating or baking and would melt when placed on top of hot pizza ovens where pizza boxes are typically stored.

SUMMARY OF THE INVENTION

The invention provides a reusable pizza pan set for holding, transporting, reheating and serving pizza. The pizza pan set is comprised of a bottom having raised domes or projections to keep the pizza elevated and therefore stay crisper, a lid having a shape which which facilitates rigidity, convective heat flow and condensation flow along the inner surface of the lid., and, optionally, a removable mesh screen insert (Vapor Transport Mechanism) inserted into the lid. When the lid is placed onto the bottom, it creates a heat-retaining chamber that channels condensation. The pan set will not affect the pizza quality, maintaining a fresh-from-the-oven, cardboard-free taste with a crispy crust.

DETAILED DESCRIPTION OF THE INVENTION

Figure 1:
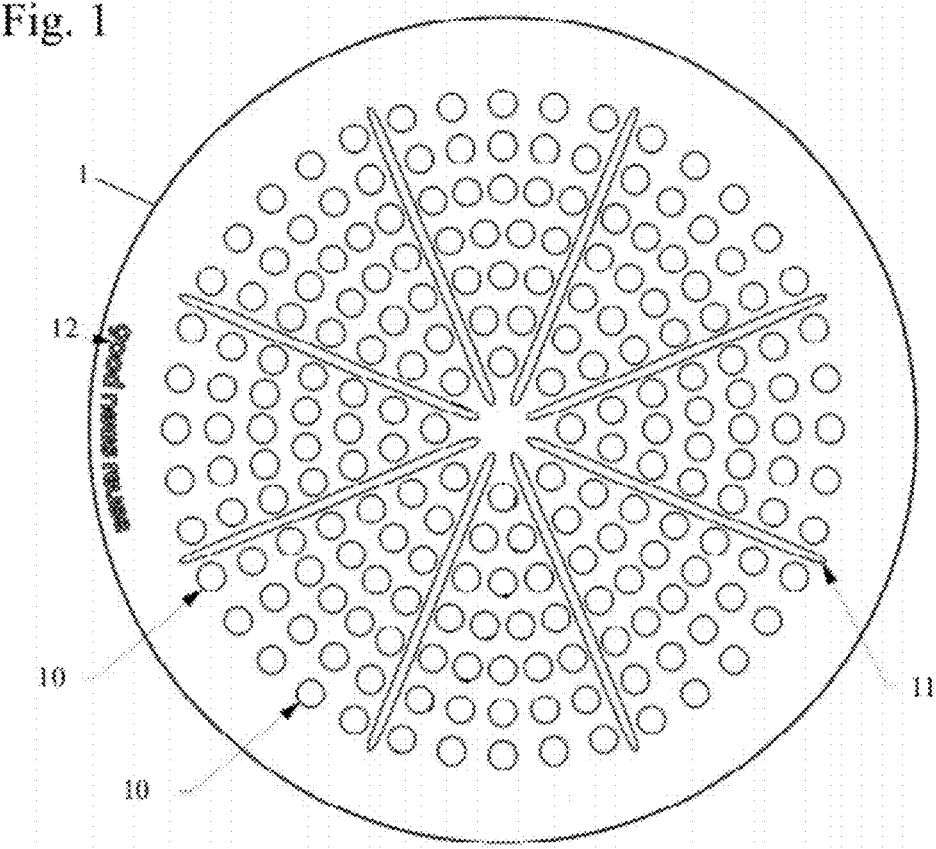
FIG. 1 shows a top view of the bottom of a pizza pan of the invention.
Figure 2:
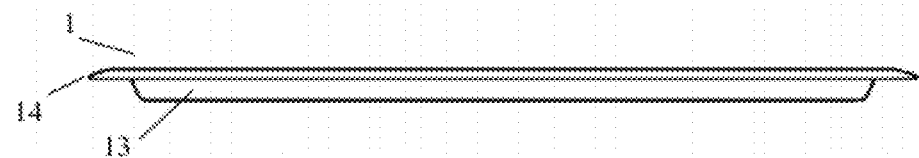
FIG. 2 shows a side view of the bottom of a pizza pan of the invention.
Figure 3:
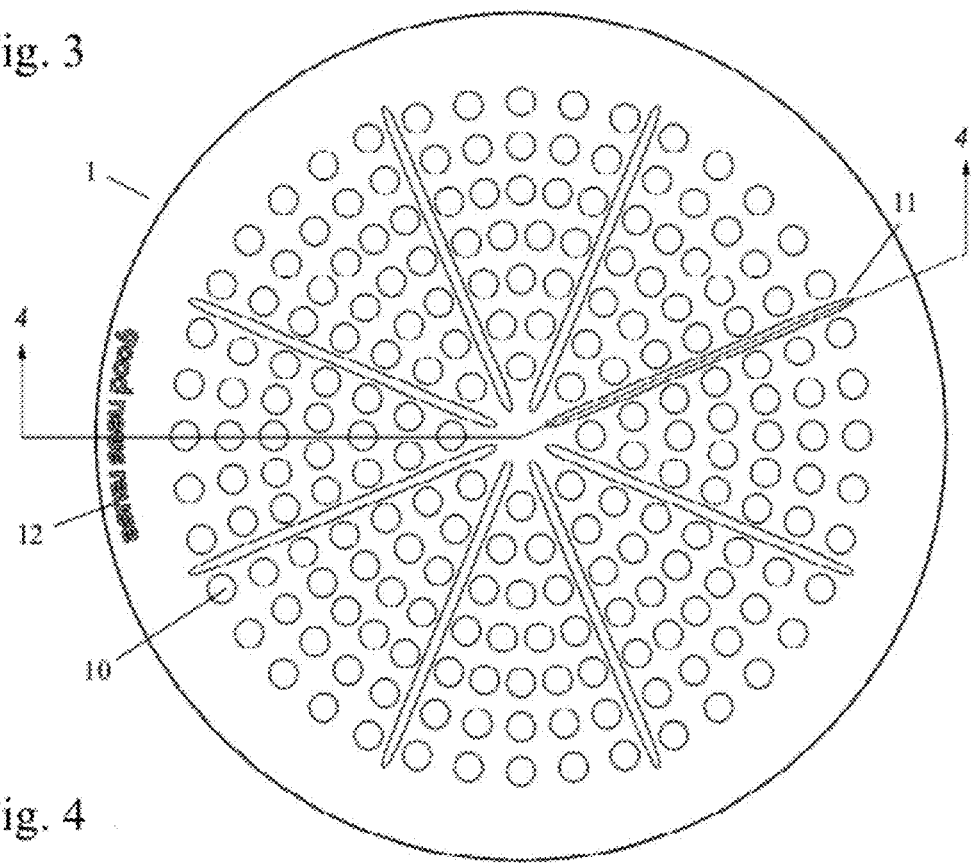
FIG. 3 shows another top view of the bottom of a pizza pan of the invention.
Figure 4:
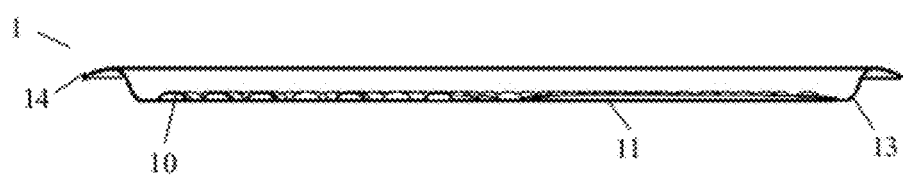
FIG. 4 shows a section view along lines 4-4 of FIG. 3.
Figure 5:
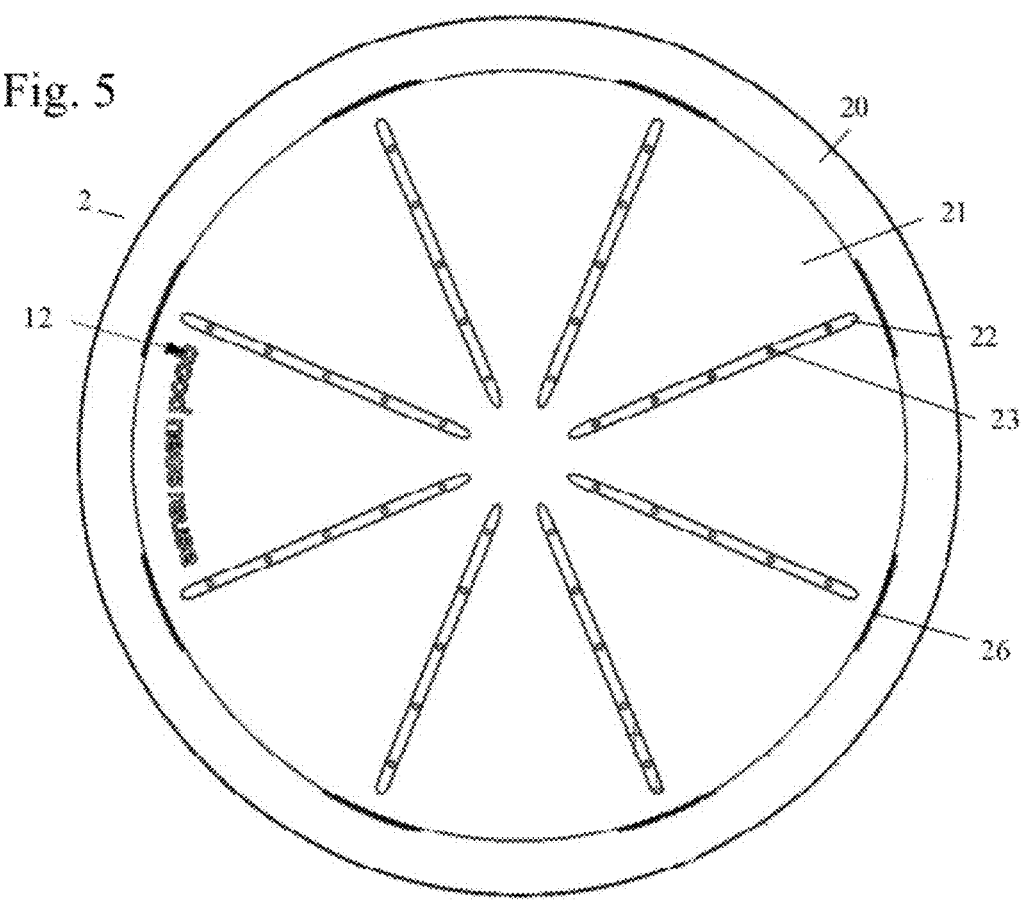
FIG. 5 shows a top view of a lid of a pizza pan of the invention.
Figure 6:
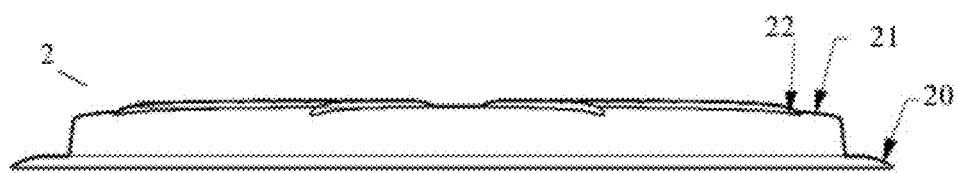
FIG. 6 shows a side view of a lid of a pizza pan of the invention.
Figure 7:
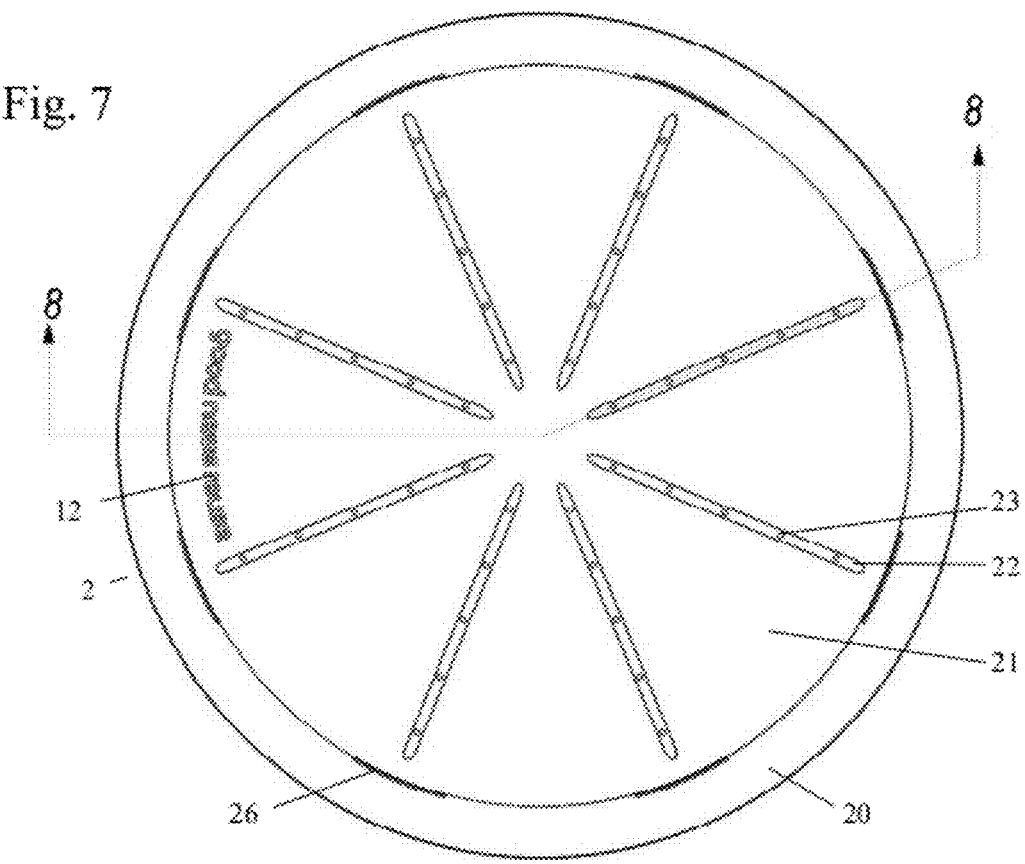
FIG. 7 shows another top view of a lid of a pizza pan of the invention.
Figure 8:
FIG. 8 shows a section view along lines 8-8 of FIG. 7.
Figure 9:
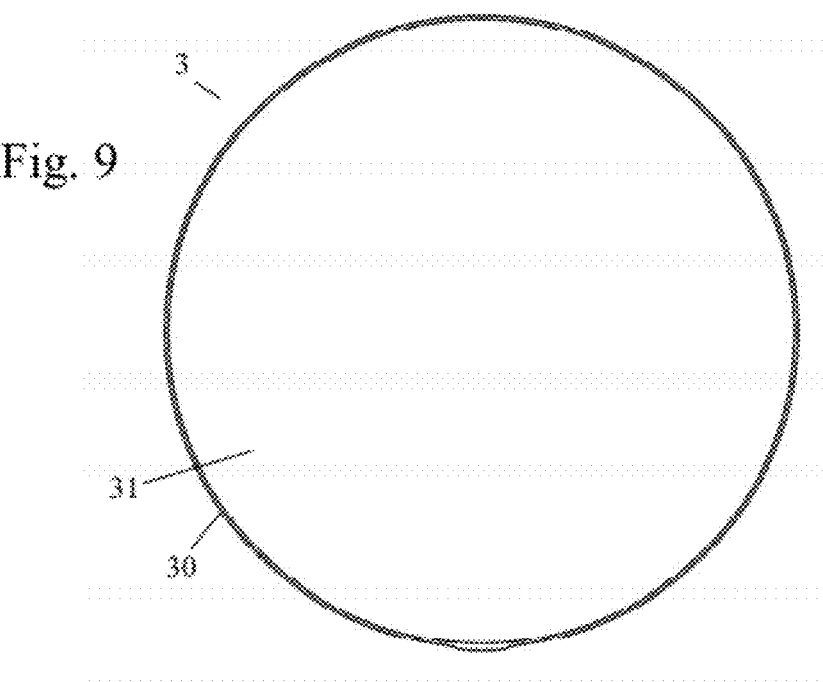
FIG. 9 shows a top view of a vapor transport mechanism of the invention.
Figure 10:
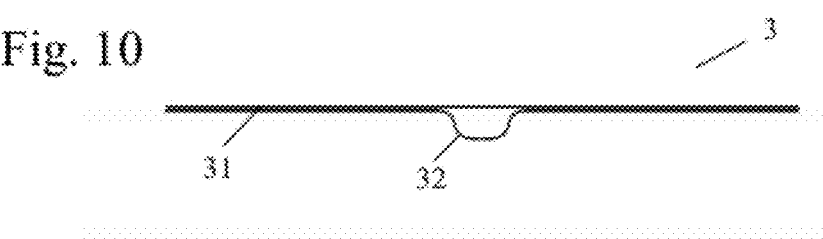
FIG. 10 shows a side view of a vapor transport mechanism of the invention.
Figure 11:
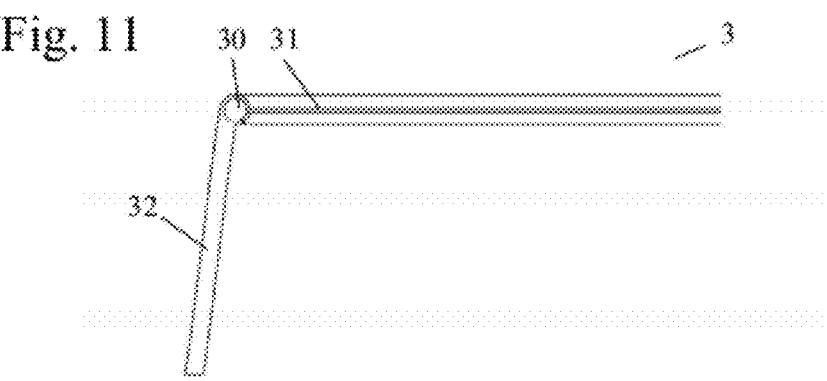
FIG. 11 shows a detailed section of a vapor transport mechanism of the invention.
Figure 12:
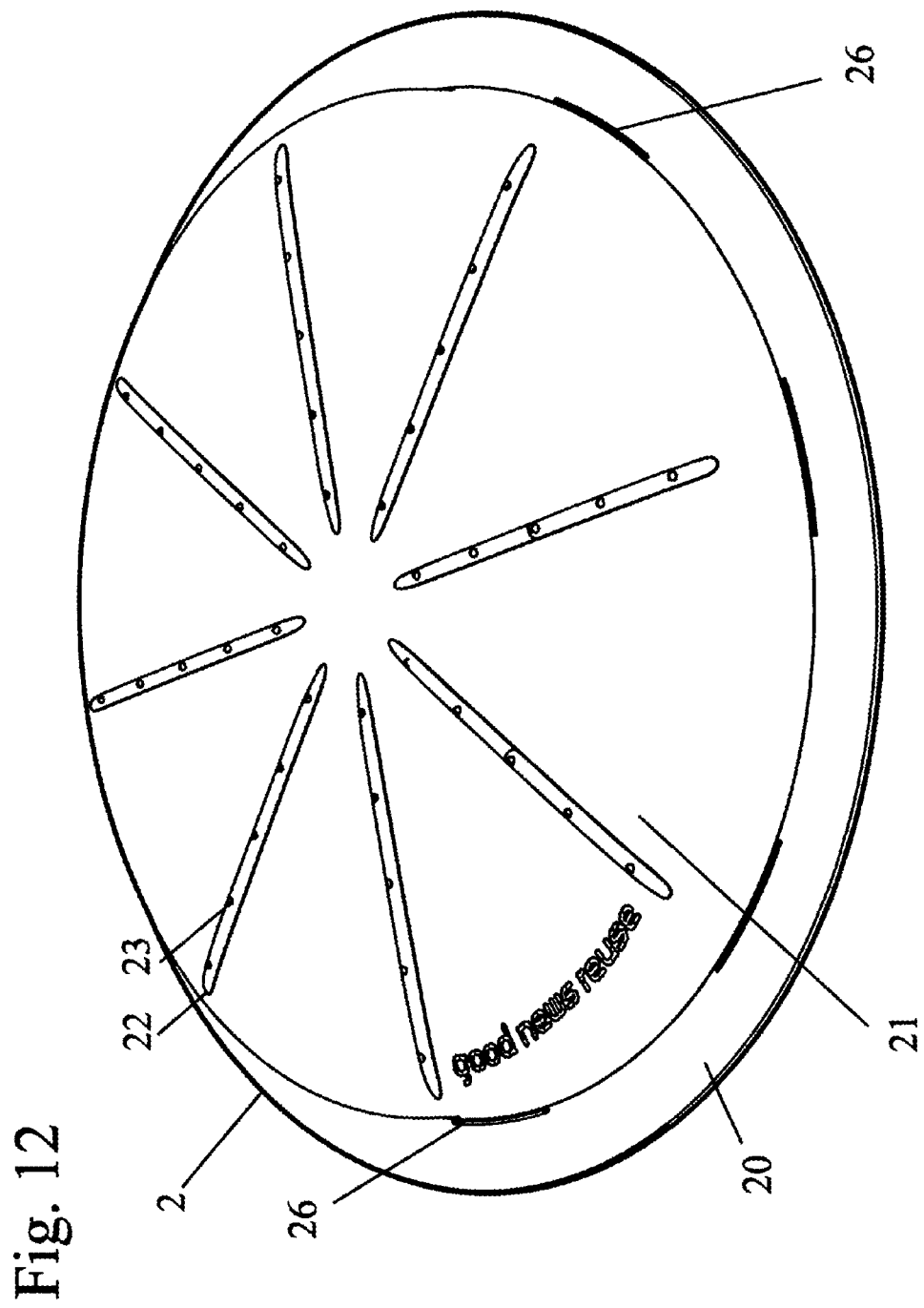
FIG. 12 shows a picture of a pizza pan of the invention, with bottom and lid.
Figure 13:
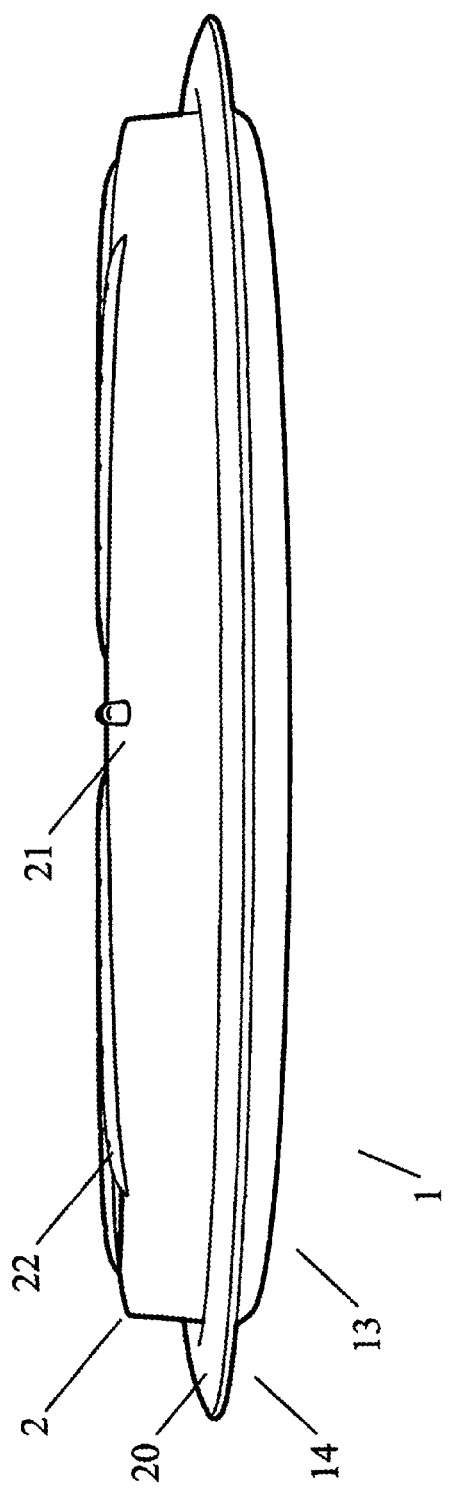
FIG. 13 shows a side view picture of a pizza pan, showing how the flared rim of the lid extends over the flared rim of the bottom for a secure fit.
Figure 14:
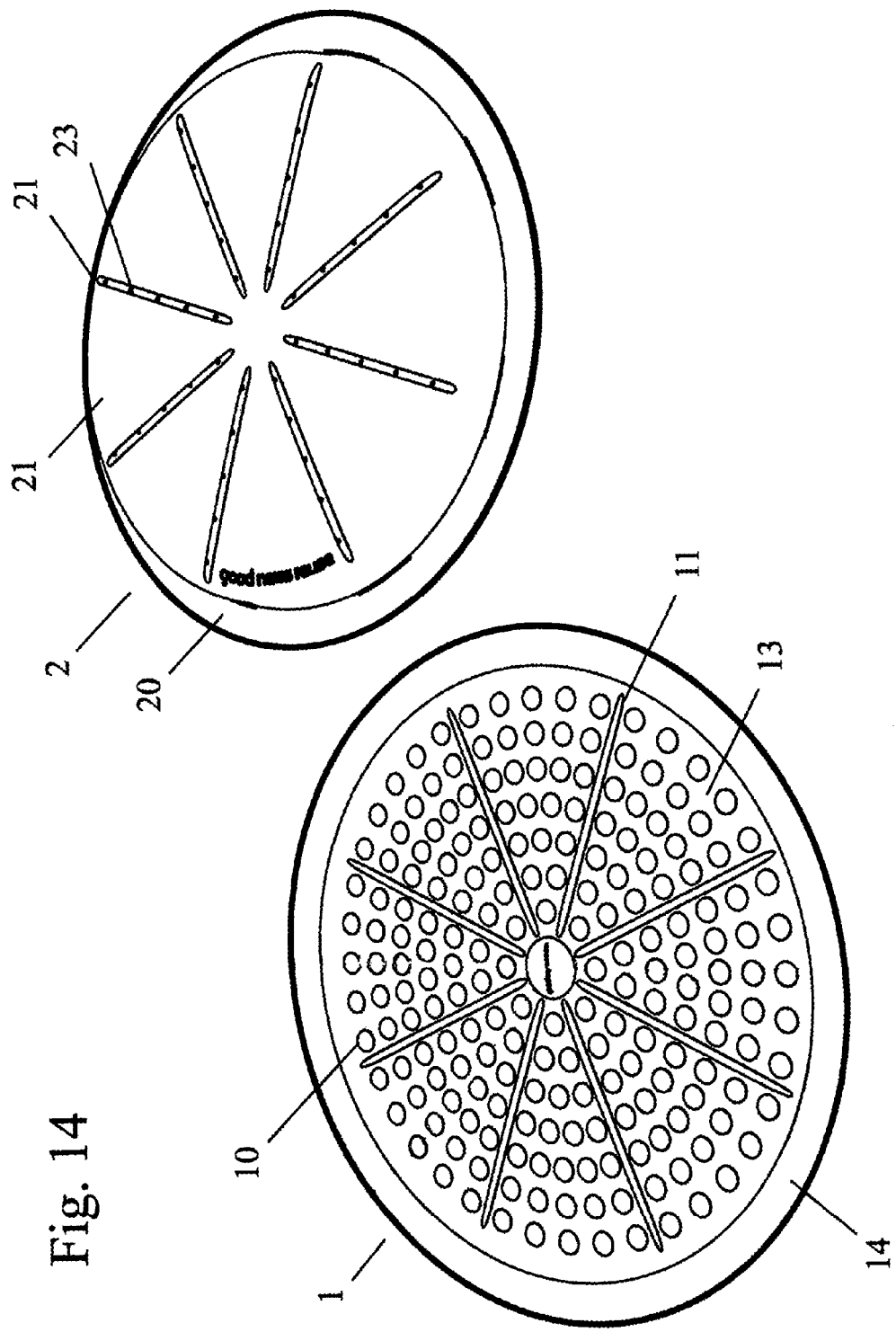
FIG. 14 shows a pizza pan of the invention, with the lid removed and next to the bottom.
Figure 15:
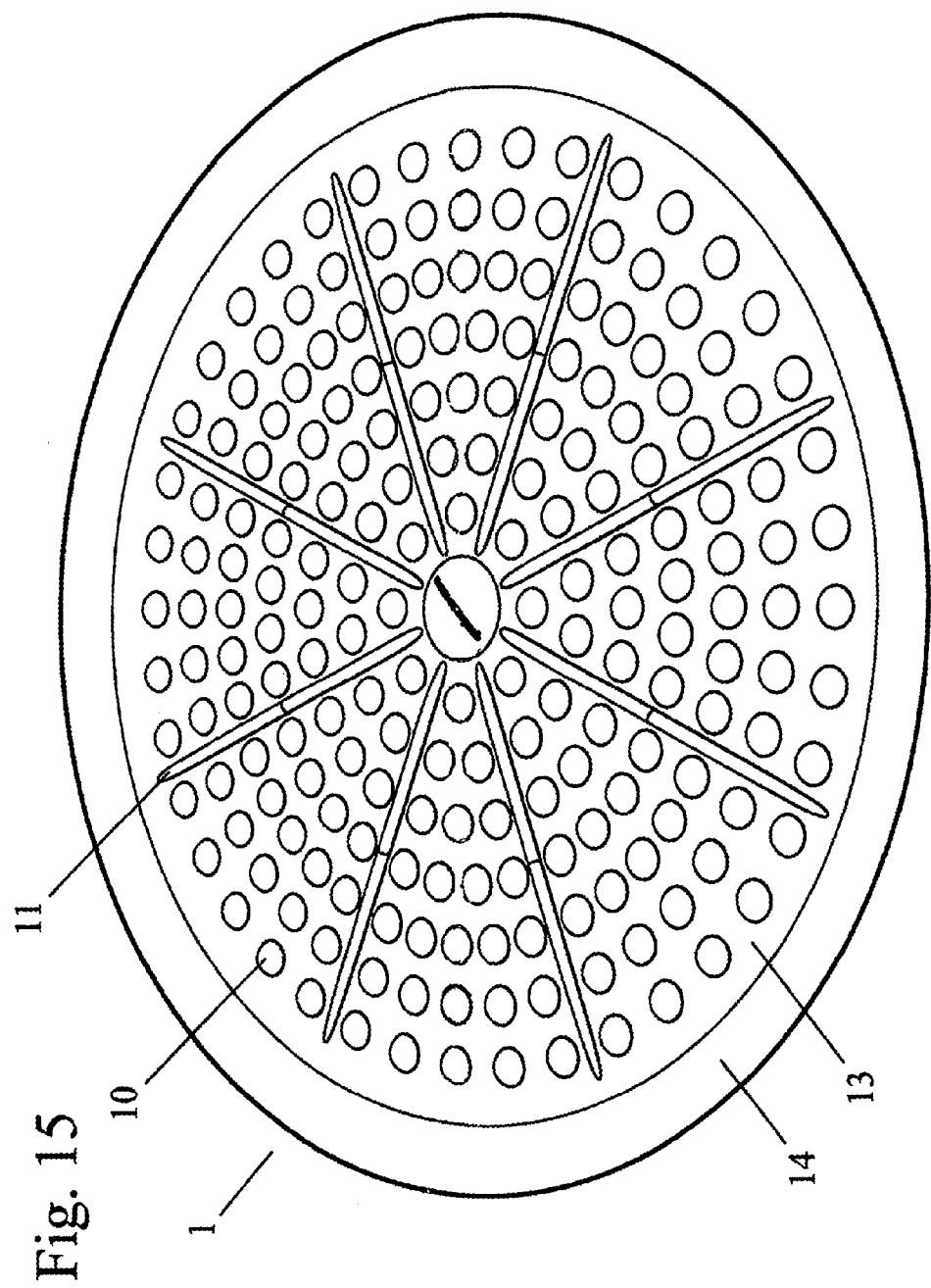
FIG. 15 is a larger view of a bottom of a pizza pan of the invention.
Figure 16:
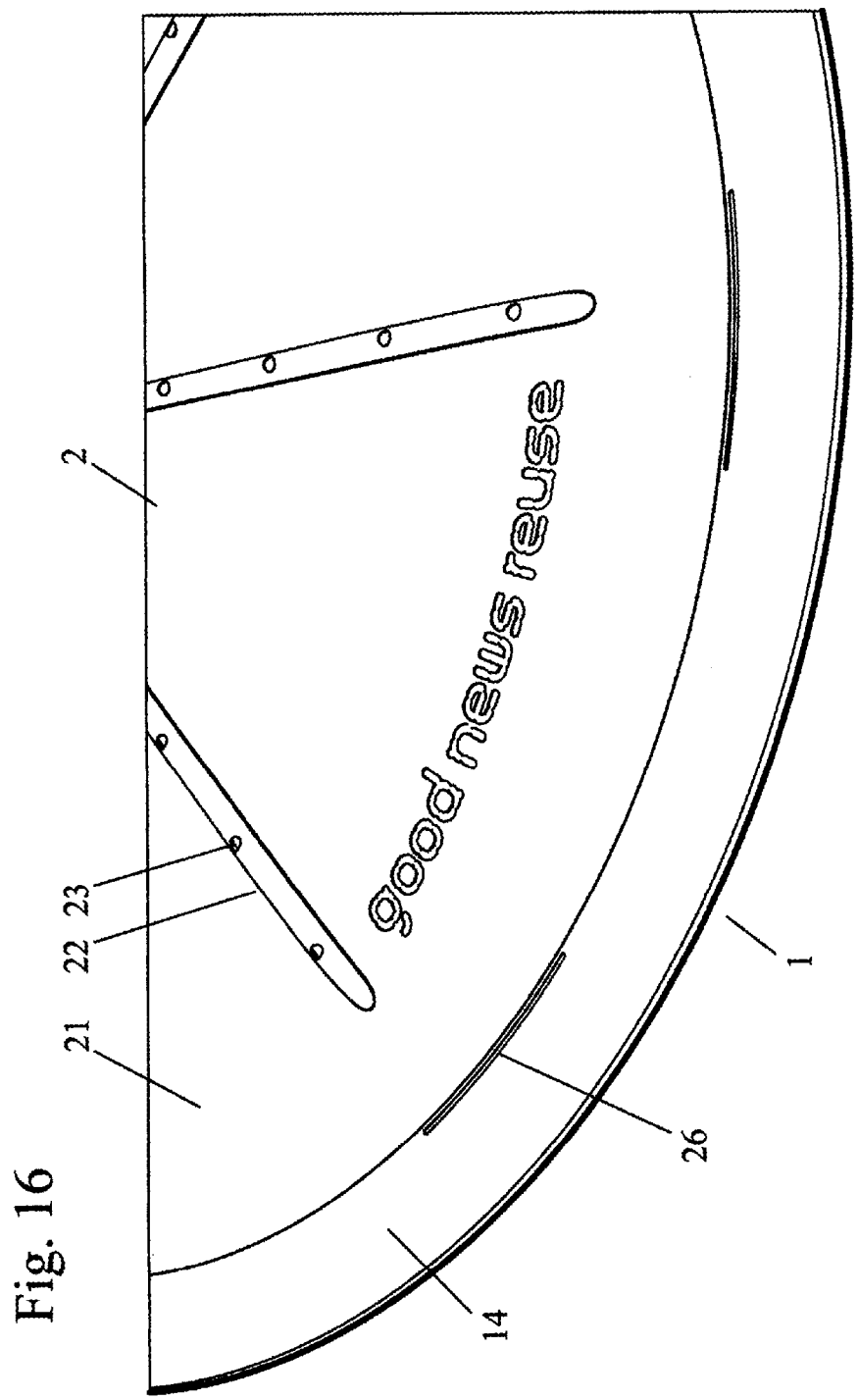
FIG. 16 is a close-up of a pizza pan of the invention, showing the side vents and the lid nesting on the bottom.
Figure 17:
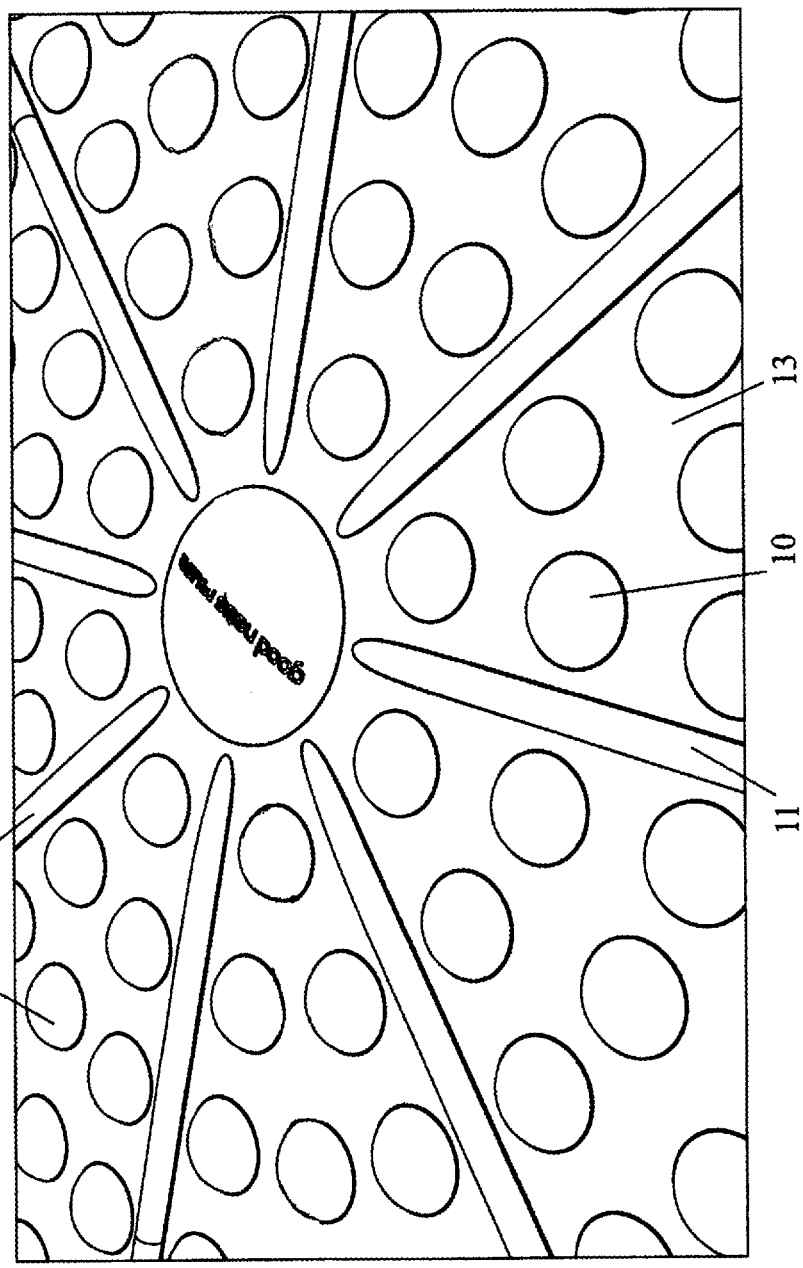
FIG. 17 is a close-up of the center of a bottom of a pizza pan of the invention, showing the raised domes and radial raised ribs (slices structure) to keep a pizza elevated for air circulation under the pizza.
Figure 18:
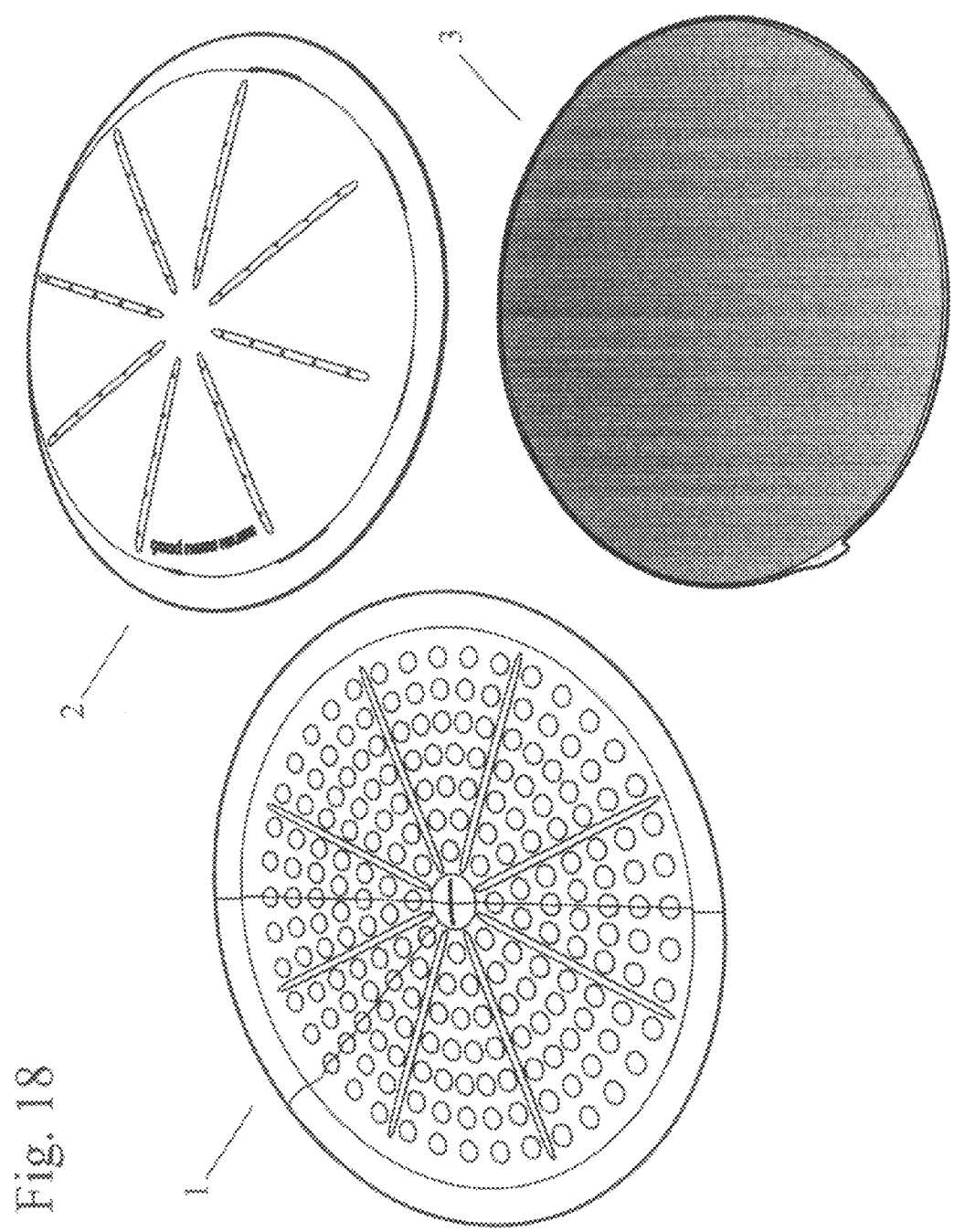
FIG. 18 is a view of a pizza pan of the invention, with a bottom, lid and vapor transport mechanism placed next to each other.
Figure 19:
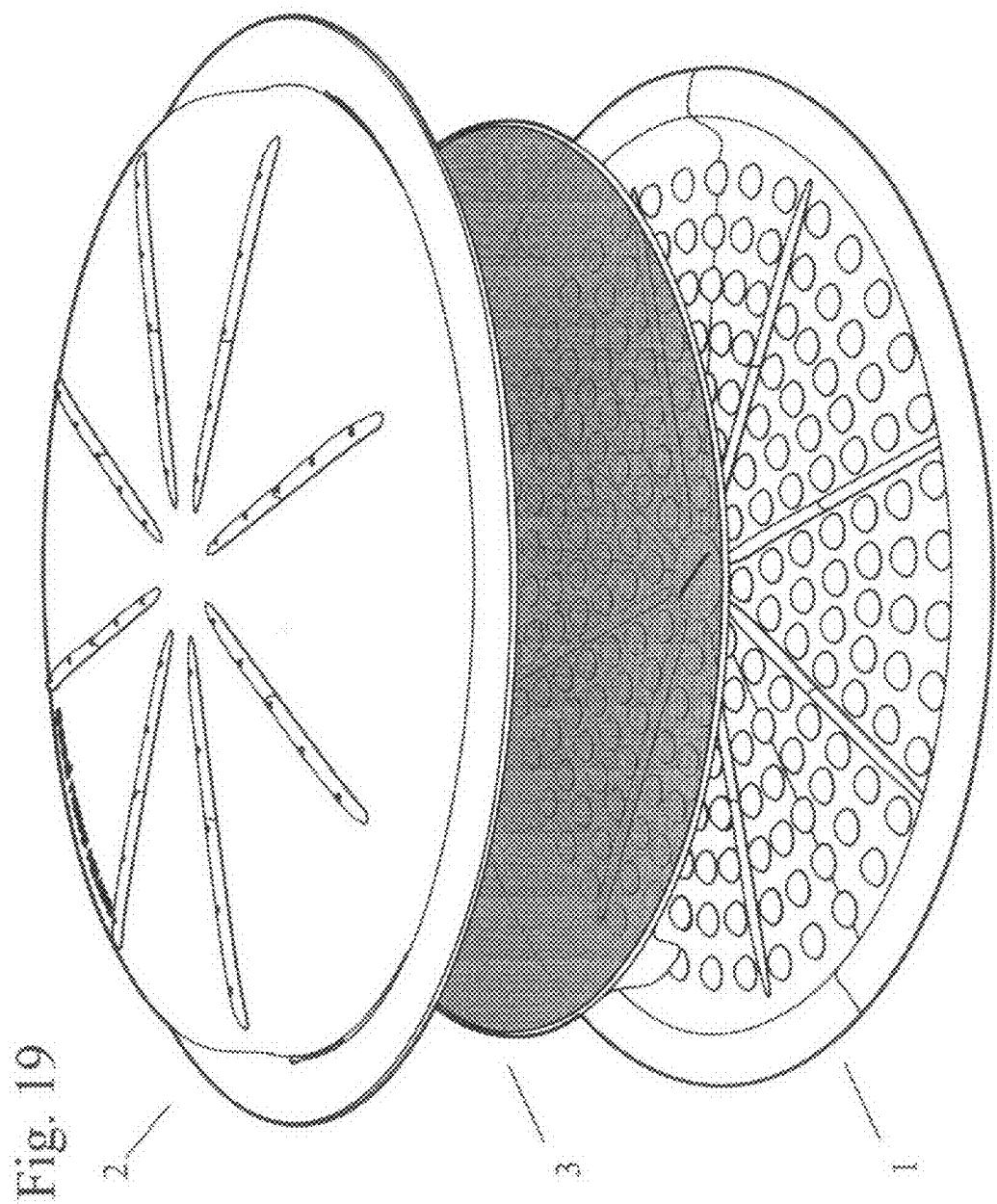
FIG. 19 is a view of a pizza pan of the invention, with a bottom, lid and vapor transport mechanism assembled vertically.
Figure 20:
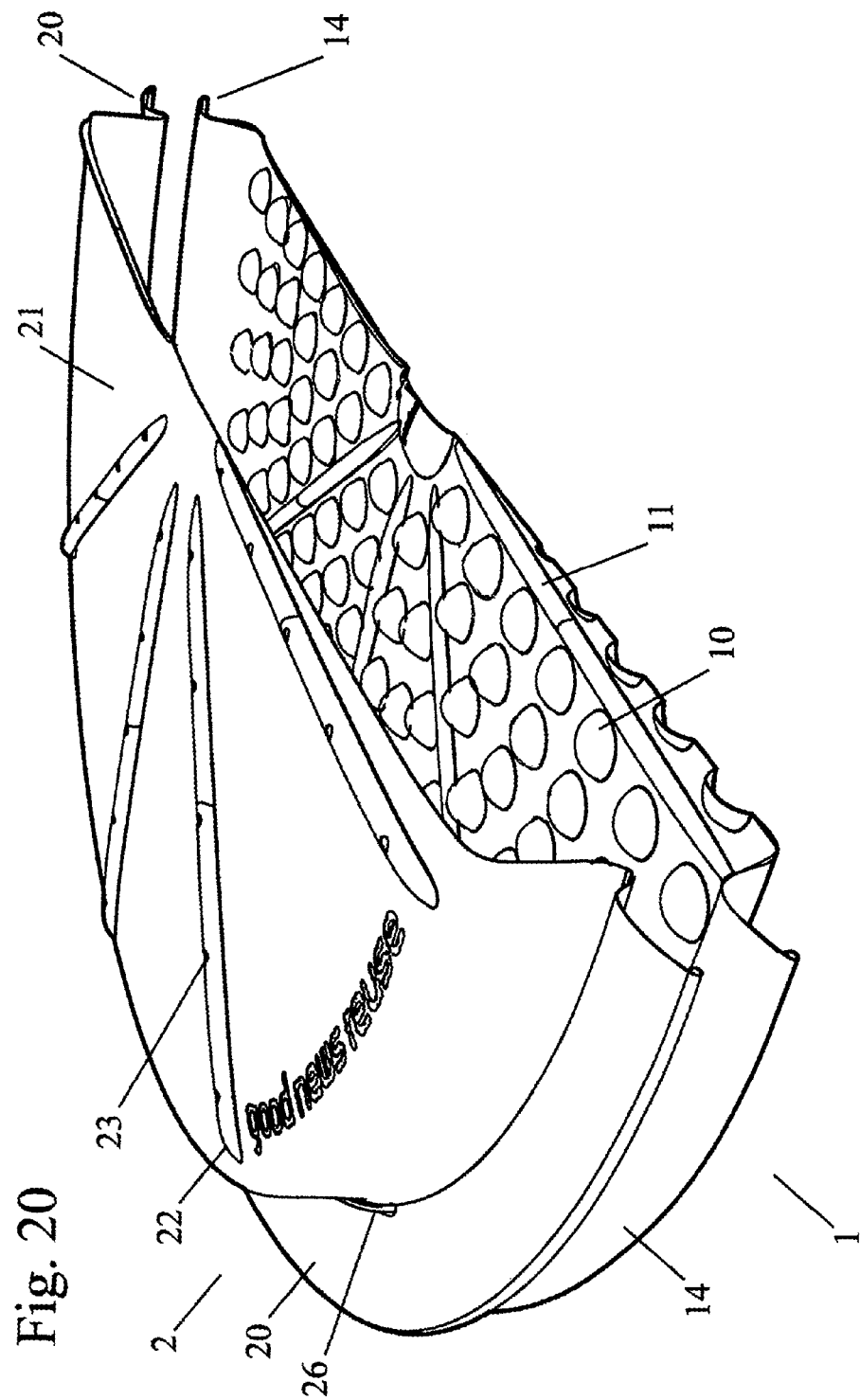
FIG. 20 is a view of a cut-through pizza pan of the invention, with a bottom and lid nested together.
Figure 21:
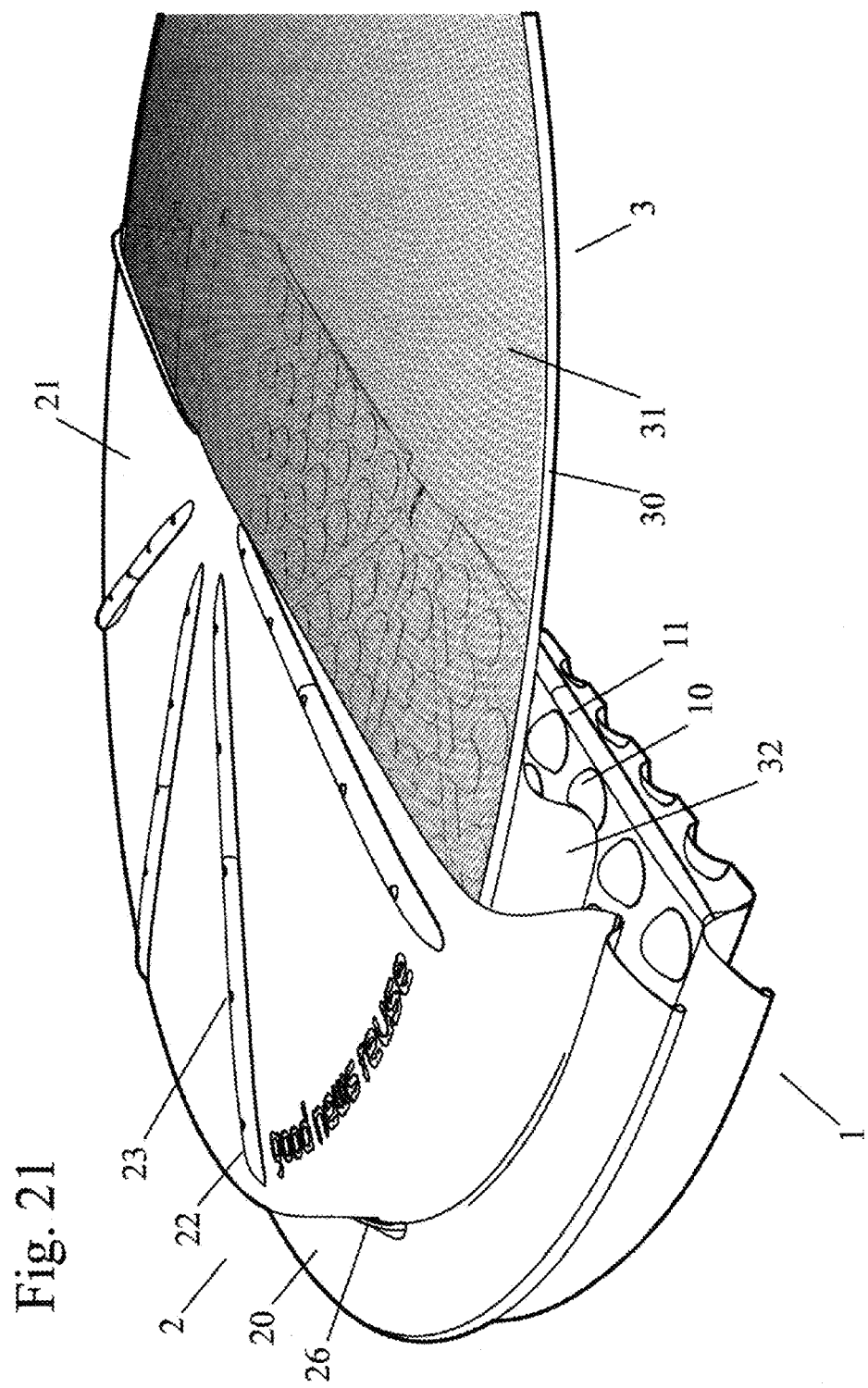
FIG. 21 is a view of a cut-through pizza pan of the invention, with a bottom, lid and vapor transport mechanism assembled for use.

This invention is a reusable multi-purpose pizza pan set for holding, transporting, reheating and serving pizza which provides a reusable alternative to conventional single-use cardboard pizza boxes.

Referring to the figures, the pizza pan set of the invention has a circular bottom 1 and a circular lid 2 and an optional removable mesh screen insert 3 for wicking moisture.

The central area 13 of the bottom 1 has raised circular domes 10 to elevate the pizza and facilitate the flow of heat for crispy crusts. The domes 10 are preferably evenly spaced in a polar array configuration around the center point of the pan. A flared exterior rim 14 allows the pan set to be handled when holding a hot pizza. A number of ribs 11, a stacking, rigidity and crisping feature, run radially across the central area 13 from the center to the rim 14 of the bottom 1.

The domed top area 21 of the lid 2 preferably has a slightly domed complex curve to promote convection heat flow and to funnel condensation to the sides for moisture management. The lid 2 has a flared rim 20 that extends over the flared rim 14 of the bottom 1, nesting for a secure fit during transport and handling. The lid 2 preferably includes perforated raised ribs 22 with holes 23 extending radially from the center almost to the edge of the lid 2 to aid in providing a rigid structure. The lid may also include side vents 26 around the periphery of the domed top area 21 that allow venting.

A manufacturer's logo or slogan 12 may be formed into the lid 2 and bottom 1 as desired.

Both the bottom 1 and lid 2 have flared exterior rims 14 and 20 for handling. The raised ribs (slices structure) 11 on the bottom 1 mate over the top of the raised ribs 22 on the lid 2 for stacking. The extended rim 20 of the lid 2 nests over the extended rim 14 of the bottom 1 for a secure fit during transport and handling.

The bottom 1 and lid 2 are preferably constructed of thin commercial food grade metal. The use of advanced shapes in the design enables an embodiment to use very thin food grade stainless steel that minimizes the amount of materials and resources while maintaining product strength and durability.

A removable mesh screen insert or Vapor Transport Mechanism (VTM) 3, has a screen 31, preferably held taut by a resilient peripheral ring 30. The VTM 3 traps excessive moisture that could occur when a hot pizza is placed in a closed container. The VTM 3 fits on the inside of the lid 2 and allows steam to rise through the screen 31, yet keeps condensation on the lid 2 from falling back into the pizza in the bottom 1.

Preferably, the VTM 3 has a "spring" action. A tab 32, preferably of silicone, allows for easy removal. The mesh screen 31 is preferably made of fine micromesh metal wrapped in silicone.

While the VTM 3 can provide a crispier pizza, the pan set can be used without the VTM insert 3, as the complex curvature of the lid 2 will facilitate transport of any moisture buildup.

The geometries of the design are easily extendable into different sizes.

The pan is lightweight yet strong, durable for 500+ uses, withstands high heat and is easy to clean. It is also recyclable at any point in its lifecycle.

The use of sustainable metals to manufacture the pan helps to maintain the pizza temperature and deliver a product with a fresh, cardboard-free taste.

The reusable pan set provides multiple solutions to meet operator and consumer functional needs: it is a stackable container to hold and/or transport hot pizza; the bottom 1 functions as an oven-safe pan for reheating or baking pizza or other food products; and the bottom 1 can be used as a serving platter at home or in restaurants.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reusable pizza container configured to hold a hot pizza, the pizza container comprising:
    a circular bottom comprising: an exterior rim concentrically surrounding a central area; a plurality of raised domes spaced across the central area; and an interior moat concentrically surrounding the central area; and
    a circular lid comprising: an exterior rim concentrically surrounding a top area, the rim being sized to fit over and nest with the exterior rim of the circular bottom; and a plurality of perforated raised ribs extending radially across the top area from a central portion of the top area toward the exterior rim;
    wherein a Vapor Transport Mechanism is attached to an interior of the top area of the circular lid, the Vapor Transport Mechanism comprising: a circular frame that holds a micromesh membrane, wherein the micromesh is sized to allow vapor to pass upward though the membrane but prevents moisture from passing downward through the membrane.

2. The reusable pizza container of claim 1, in which the circular frame comprises a resilient peripheral ring holding the micromesh membrane taut to allow vapor to pass upward through the membrane but prevents moisture from passing downward through the membrane.

3. The reusable pizza container of claim 1, in which the internal moat of the circular bottom collects moisture from the lid.

4. The reusable pizza container of claim 1, in which the circular bottom has an interior rim that allows the Vapor Transport Mechanism and circular lid to nest inside the concentric ring of the circular bottom.

5. The reusable pizza container of claim 1, in which the Vapor Transport Mechanism prevents droplets of moisture adhering to the interior surface of the circular lid from dripping onto the pizza surface if said droplets of moisture are dislodged from the circular lid due to external shocks occurring during transportation.

6. The reusable pizza container of claim 1, wherein the circular lid has interior sides that direct moisture to the interior moat of the circular bottom stopping said moisture from entering the periphery of the upper pizza surface to prevent sogginess.

7. The reusable pizza container of claim 1, in which the plurality of raised ribs in the circular lid are perforated to allow moisture within the reusable pizza container to escape.

* * * * *

UNITED STATES PATENT AND TRADEMARK OFFICE
CERTIFICATE OF CORRECTION

PATENT NO. : 9,446,889 B2  
APPLICATION NO. : 13/344902  
DATED : September 20, 2016  
INVENTOR(S) : Lopes et al.

Page 1 of 1

It is certified that error appears in the above-identified patent and that said Letters Patent is hereby corrected as shown below:

On the Title Page

Item (54) and in the Specification, Column 1, Line 1, Title should read:

--Reusable Pizza Container--.

Signed and Sealed this  
Twenty-eighth Day of February, 2017

Michelle K. Lee  
*Director of the United States Patent and Trademark Office*